United States Patent [19]

Duvenkamp

[11] Patent Number: 4,822,102
[45] Date of Patent: Apr. 18, 1989

[54] FOLDABLE HEADREST FOR A VEHICLE SEAT, ESPECIALLY FOR THE REAR SEAT OF A PASSENGER CAR

[75] Inventor: Manfred Duvenkamp, Trebur, Fed. Rep. of Germany

[73] Assignee: General Motors Corporation, Detroit, Mich.

[21] Appl. No.: 65,490

[22] Filed: Jun. 23, 1987

[30] Foreign Application Priority Data

Jun. 25, 1986 [DE] Fed. Rep. of Germany ....... 3621278

[51] Int. Cl.⁴ .............................................. A47C 7/36
[52] U.S. Cl. .................................... 297/403; 297/408; 297/410
[58] Field of Search ............... 297/403, 408, 410, 391, 297/409

[56] References Cited

U.S. PATENT DOCUMENTS

| | | | |
|---|---|---|---|
| 3,608,965 | 9/1971 | Cziptschirsch | 297/410 |
| 4,082,354 | 4/1978 | Renner et al. | 297/410 |
| 4,626,028 | 12/1986 | Hatsutta et al. | 297/408 X |
| 4,639,039 | 1/1987 | Donovan | 297/410 X |
| 4,647,108 | 3/1987 | Hayashi | 297/410 X |
| 4,674,792 | 6/1987 | Tamura et al. | 297/408 |
| 4,674,796 | 6/1987 | Weinich et al. | 297/410 X |

FOREIGN PATENT DOCUMENTS

| | | | |
|---|---|---|---|
| 674616 | 3/1939 | Fed. Rep. of Germany | 297/408 |
| 2726141 | 12/1978 | Fed. Rep. of Germany | 297/391 |
| 2856695 | 7/1979 | Fed. Rep. of Germany | 297/408 |
| 2925781 | 1/1981 | Fed. Rep. of Germany | 297/408 |

*Primary Examiner*—Peter A. Aschenbrenner
*Attorney, Agent, or Firm*—Ernest E. Helms

[57] ABSTRACT

A foldable headrest (2, 3) for, preferably, the rear seat of a passenger car, of the type mounted for pivoting movement on the backrest (1), is in the form of a multi-piece assembly and includes at least one height-adjustable support element (12, 13) between upper and lower headrest members (8, 9, 10, 11). The headrest (2, 3) is designed to permit a wide range of adjustments, including adjustment of its angular position through pivoting movement, as well as height adjustment of headrest members, and is therefore suitable to accommodate, in a relatively simple manner, a great variety of seat occupants.

6 Claims, 8 Drawing Sheets

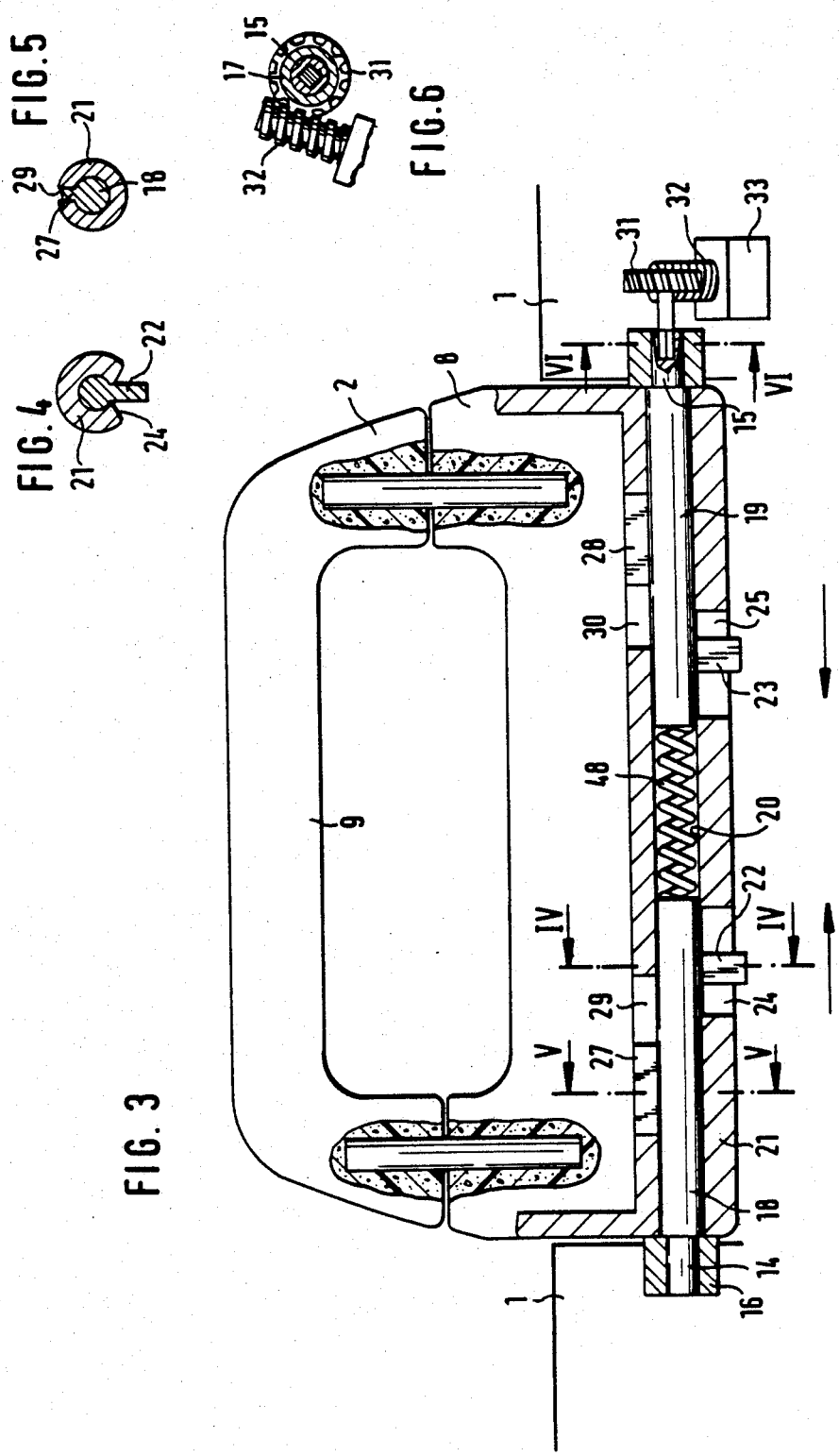

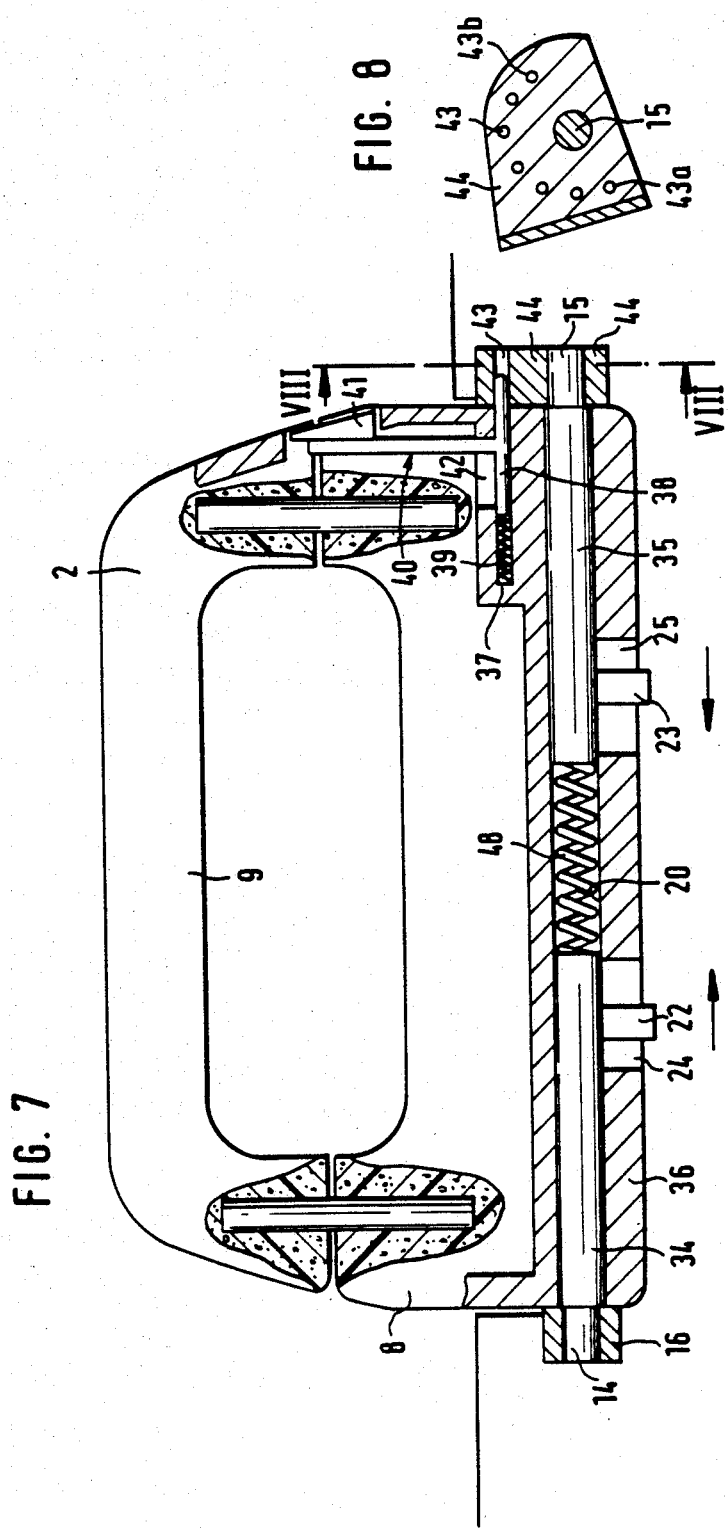

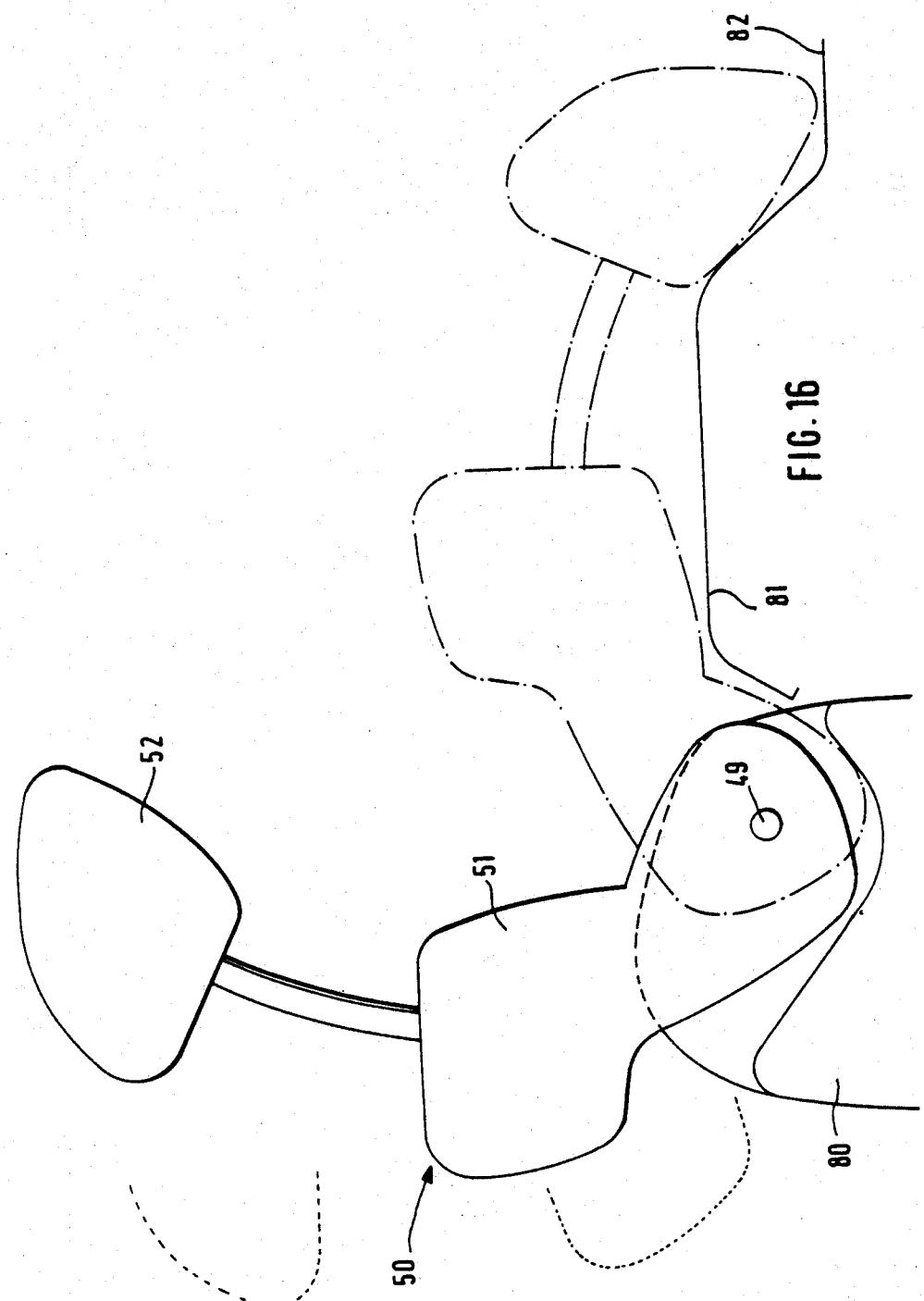

FOLDABLE HEADREST FOR A VEHICLE SEAT, ESPECIALLY FOR THE REAR SEAT OF A PASSENGER CAR

The invention relates to a foldable headrest assembly for a vehicle seat, especially for the rear seat of a passenger car, which is mounted for pivotable movement on the rear seat.

A headrest of the type described above has been disclosed in German Offenlegungsschrift No. 31 36 648. This prior art headrest is automatically pivoted, by means of a servo mechanism, from a storage position, in which it is folded down rearwardly, into a head-support position when the associated seat is used by an occupant. Thereafter, the headrest may be manually pivoted by the seat occupant from this initial position to a selected angular position best suited for his comfort. When the occupant vacates the seat, the headrest automatically returns from the head support position into the storage position. The pivoting movements from and into the storage position are initiated by a weight-responsive switch mounted in the seat, and a manually actuable switch is provided by which the headrest can be moved into various head-support positions. This arrangement provides that the headrest is in the head-support position only when the seat is occupied. Since the headrest, during the time the seat is unoccupied, is in a storage position in which it is folded down, the driver of the vehicle is afforded a better view towards the rear. The disadvantage of this prior art arrangement is that the pivotable adjustment feature enables to meet the comfort requirements of the vehicle occupant only to a limited degree, and that other, more comprehensive adjustment means are not included in the arrangement.

It is the object of the present invention to provide a headrest of the type described above which enables a great variety of adjustments and which is adapted to meet, through relatively simple means, the comfort requirements of a large number of seat occupants.

In accordance with the invention, this object is being achieved in that the headrest is a multiple part assembly, and in that a height-adjustable support member is interposed between a headrest top and a headrest bottom member.

The arrangement according to the invention enables the headrest to be pivoted into selective angular positions as well as to be adjusted, by the adjustment of headrest members, into selective height positions. This will permit to adapt the headrest position to the particular size and/or seating position of a large variety of seat occupants and will provide optimum head-support kinematics in the event the vehicle is struck from the rear. Furthermore, the height adjustability feature enables to reduce the headrest storage space in the utility shelf, since the headrest occupies a smaller volume of space when it is in its lowermost position. This space-conserving feature is particularly advantageous in the case of compact cars. Furthermore, if the purpose of folding down the headrest is that of gaining cargo space, a height-adjustable headrest is advantageous inasmuch as it occupies less space when it is adjusted to its lowermost position and, if desired, folded down to the storage position.

According to a preferred embodiment of the invention, which ensures good mechanical stability, an upper and a lower headrest member are provided, and the lower headrest member is adapted, in the region near the upper side of the backrest, for pivoting movement about an axis which extends substantially parallel to the backrest. Another feature that may be incorporated into this embodiment and that will further improve rearward visibility of the driver, is an arrangement whereby the headrest, after being folded down through pivoting movement about the horizontal axis, can be turned over sideways about a vertically extending axis.

Because of its relatively large size, the lower headrest support member enables the use of a guide member with a greater guide length, so that in one embodiment according to the invention, wherein the support element is fastened to the upper support member and is displaceable in a guide member arranged in the lower headrest support member, the height-adjustment range of the headrest has been considerably enlarged and the mechanical stability of the raised headrest significantly improved.

The feature permitting manual height adjustment and proper guiding in lateral directions by the simple procedure of pushing the upper headrest member downwardly, whereby the need of lifting the support element in the guide member upwardly is eliminated, is rendered possible in that in the tubular guide member there is arranged between the rod-like support element and the bottom of the guide member a preloaded spring. The spring may be in the form of a compression-type coil spring or a pneumatic spring.

In accordance with one preferable arrangement, a click-stop mechanism is provided which includes a ratchet bar. The ratchet bar, which also serves as the headrest support member, is retained in the guide member and is adapted for stepwise adjustment therein.

According to one advantageous arrangement according to the invention, means are provided which will accomplish that the sliding movement causes the click-stop mechanism to be released at the end of the insertion stroke of the upper headrest member, and additional means are provided which will accomplish that the sliding movement causes the click-stop mechanism to be activated at the end of the spring-assisted ascending stroke of the upper headrest member. This arrangement will enable height adjustment manipulations to be executed with only one hand, namely by the simple procedure of manually applying a pressure on the upper headrest member, because the locking and release mechanism need not be actuated at the same time.

According to a further advantageous feature of the invention, means are provided that enable the upper headrest member to be adjusted to the desired height by the procedure of manually pressing the upper headrest support member inwardly against the force of the preloaded spring.

This is accomplished in a relatively simple manner in that the two engagement surfaces of each of the notches provided in the ratchet bar are slanted at dissimilar angles relative to the axis, and in that a detent element, which is resiliently arranged on the guide member, is adapted for latching engagement into the notches, the arrangement being such that during the inward movement of the upper headrest member, the latching bar is caused to be disengaged by the notch engagement surfaces that are slanted at smaller angles.

In accordance with another modification of the invention, means are provided which will enable the click-stop mechanism to remain unlatched during the entire upward stroke of headrest movement. This is accomplished in a relatively simple manner in that one section of the ratchet bar a solid cross-sectional shape and the other section is flattened and is provided with notches, and in that at the transition from the flattened to the solid section of the ratchet bar there is provided a notch having one engagement surface which is slanted at a smaller angle than the other engagement surface and which is terminating at the peripheral surface of the solid bar section on which the latching element is slidably guided for locking engagement into a detent portion arranged on the tubular member.

According to a relatively simple arrangement which requires only a few parts, the latching element is a spring leaf which extends substantially longitudinally of the tubular guide member and which has a circumferentially extending tongue-like detent portion with a slanted surface, said tongue-like detent portion being operatively associated with the inner wall of a resilient, circumferentially extending arcuate finger-like notch portion of the tubular guide member. This construction is also suitable for use with rectangular guide members and ratchet bars, because the arcuate configuration of the latching tang portion and notch portion ensures reliable operation of the mechanism.

According to a modified arrangement, the leaf spring, rather than being formed from the wall of the guide member, is attached to the guide member. This arrangement enables selection of a suitable material for the leaf spring so as to achieve the desired spring characteristics and extended spring life, and it also enables selection of a suitable material or the tubular guide member which ensures that displacement of the ratchet bar inside the guide member occurs with a minimum of friction.

Automatic activation of the click-stop mechanism during the end stage of the outward movement is effected in a simple manner in that there is provided at the ratchet bar end facing the spring element a pawl which is forced by the bias of a spring, preferably in the region of the spring leaf detent, into abutment against the spring blade and which thereby causes the spring blade to be disengaged from the recess in the tubular guide member. Preferably, disengagement of the spring leaf detent is effected by urging the spring leaf longitudinally together and/or by circumferential displacement of the spring leaf. It is desirable that the end surface of the pawl be tapered.

Adjustment of the upper headrest member into a position that meets the requirements of the seat occupant is rendered possible by the arch-shaped configuration of the notched support bar and the tubular guide member. Other benefits realized by this configuration are greater bearing length as well as improved mechanical stability. If more than two headrest members are being employed, the use of support elements or notched bars with different curvatures will further assist in adapting to the needs of the seat occupants.

The use of semi-finished stock with axially symmetrical cross section also enables simple and economical manufacture of the notched bar and the guide member.

According to one advantageous arrangement, the pawl is guided in a longitudinally extending slot of the tubular guide member. This will accomplish, in a relatively simple manner, to prevent relative twisting and distortion of the notched bar and tubular guide member and ensure smooth operation. Furthermore, this arrangement will increase operational reliability of the click-stop mechanism in that the area of pawl contact on the detent element of the click-stop mechanism is accurately defined.

Insertion of the headrest into the backrest in a simple manner and solid mounting therein is accomplished according to the invention in that the lower support member is provided with two pivot pins which are aligned with the pivot axis and which are insertable in bushings in the backrest, with at least one of the pivot pins being adapted for axial displacement. Preferably, the pivot pins are formed on the ends of the pivot spindles which are mounted for displacement against the bias of a spring arranged therebetween in a guide housing fastened to the lower headrest member. This arrangement provides that the pivot pins, after being concentrically aligned with the openings of the bushings, are urged by the bias of a spring into the bushings, without the need for any other manual assistance. Insertion of the headrest is simplified in that, according to one arrangement, the spindles are provided with actuating levers which are protruding through windows provided in the guide housing.

The invention also provides means which enable the headrest to be moved, either manually or by way of a servo mechanism, between the storage position and the head-support position, and means are provided which enable the headrest to be retained in any of the various headrest positions.

In accordance with another feature of the invention, power-operated angular headrest adjustment can be realized in a relatively simple manner in that at least one spindle is adapted to be driven for rotary movement, and in that this driveable spindle is provided with a drive cam which is guided and adapted for axial displacement in a slot of the guide housing. To render the headrest adjusting arrangement relatively simple, the invention proposes that the driveable spindle mentioned above is connected to a self-arresting electric drive mechanism. This arrangement renders unnecessary the need for a special device for retaining the headrest in the head-support position. In accordance with a further feature of the invention, a compact drive mechanism with a sensitive adjusting capability is provided in which the pivot pin of the driveable spindle mentioned above is connected to a worm gear, and wherein the worm gear is in engagement with a screw of the self-arresting type which is mounted in the backrest.

One simple and operationally reliable arrangement proposed by the invention is a latching mechanism with an axially displaceable latch bolt which is mounted in the headrest and which is adapted for locking engagement with associated recesses of an arresting member. Preferably, the slidable latch bolt is adapted to be displaced, by way of a manually actuable control lever arranged on the outer side of the headrest, against the bias of a spring arranged in a bore of the guide housing, and the catch member is an integral portion of bushing for the pivot pin.

Other details and advantages will become apparent from the following description of various exemplary embodiments which are illustrated in the drawings.

IN THE DRAWINGS

FIG. 3 is a partial sectional view of the mounting arrangement of an electrically adjustable headrest;

FIG. 4 is a section along line IV—IV of FIG. 3;

FIG. 5 is a section along line V—V of FIG. 3;

FIG. 6 is a section along line VI—VI of FIG. 3;

FIG. 7 is a partial section of the mounting of a manually adjustable headrest;

FIG. 8 is a section along line VIII—VIII of FIG. 7;

FIGS. 15 and 16 are schematic views of the headrest according to FIG. 9 in various positions.

Figure 1:
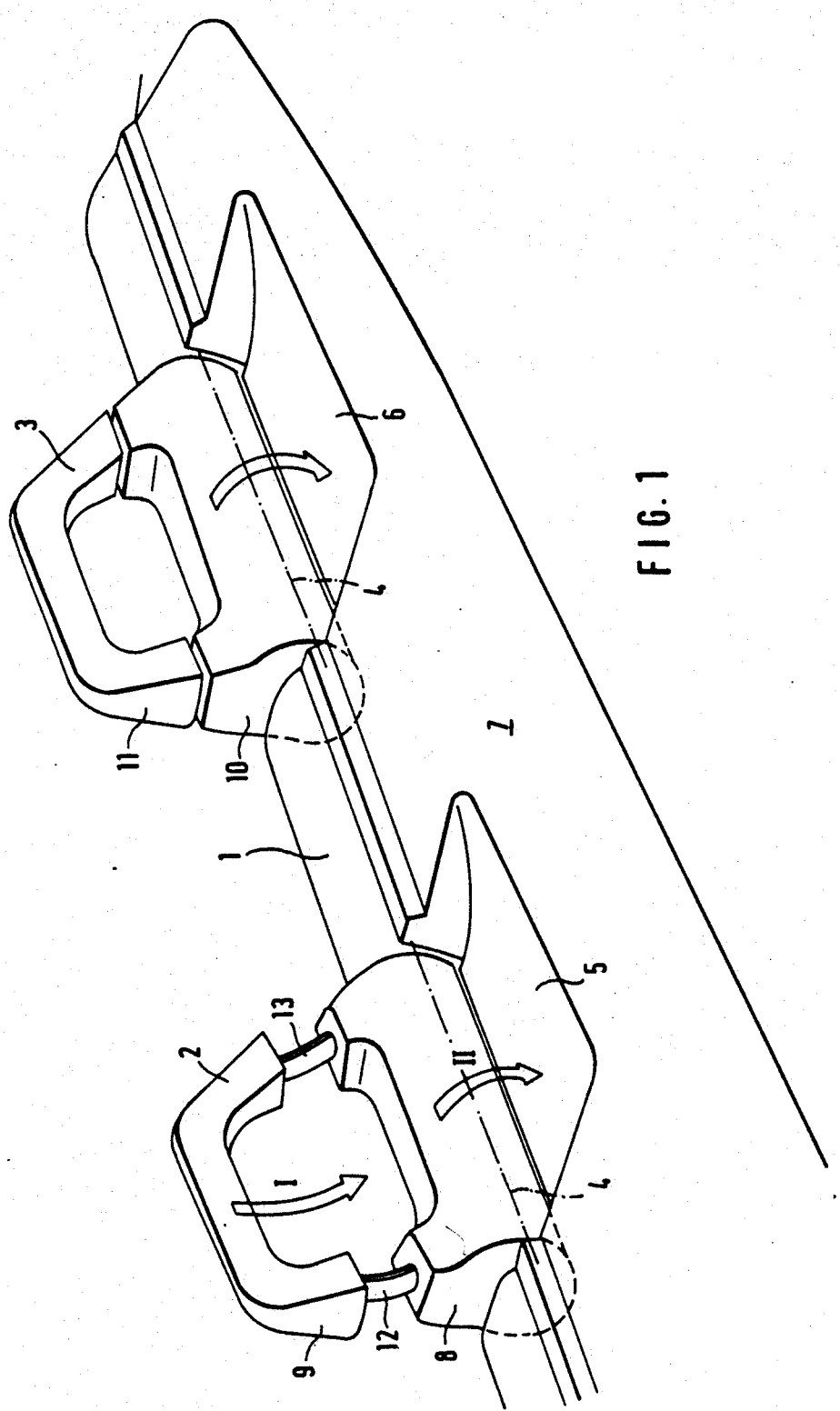
FIG. 1 is a perspective view of the rear seat backrest and the utility shelf of a passenger car with two headrests according to the invention, one headrest being illustrated with the upper headrest member in the fully inserted position, and the other with the upper headrest member in an upwardly adjusted position.

In FIG. 1, the backrest 1 of a rear seat of a passenger car and the two headrests 2, 3 arranged thereon, are illustrated in perspective. The headrests 2, 3 are mounted near the upper side of the backrest 1 for individual pivoting movement between a storage and a head support position, with the pivoting axis 4 extending substantially parallel to the backrest, and are adapted for locking engagement into one of the head-support positions. In FIG. 1 the headrests 1, 2 are pivoted in a head-support position which is basically the same for both headrests. The headrests 1, 2 may be folded rearwardly into a storage position and, when in this position, a substantial portion thereof is recessed in compartments 5, 6 provided in the utility shelf 7 behind the backrest 1.

Figure 2:
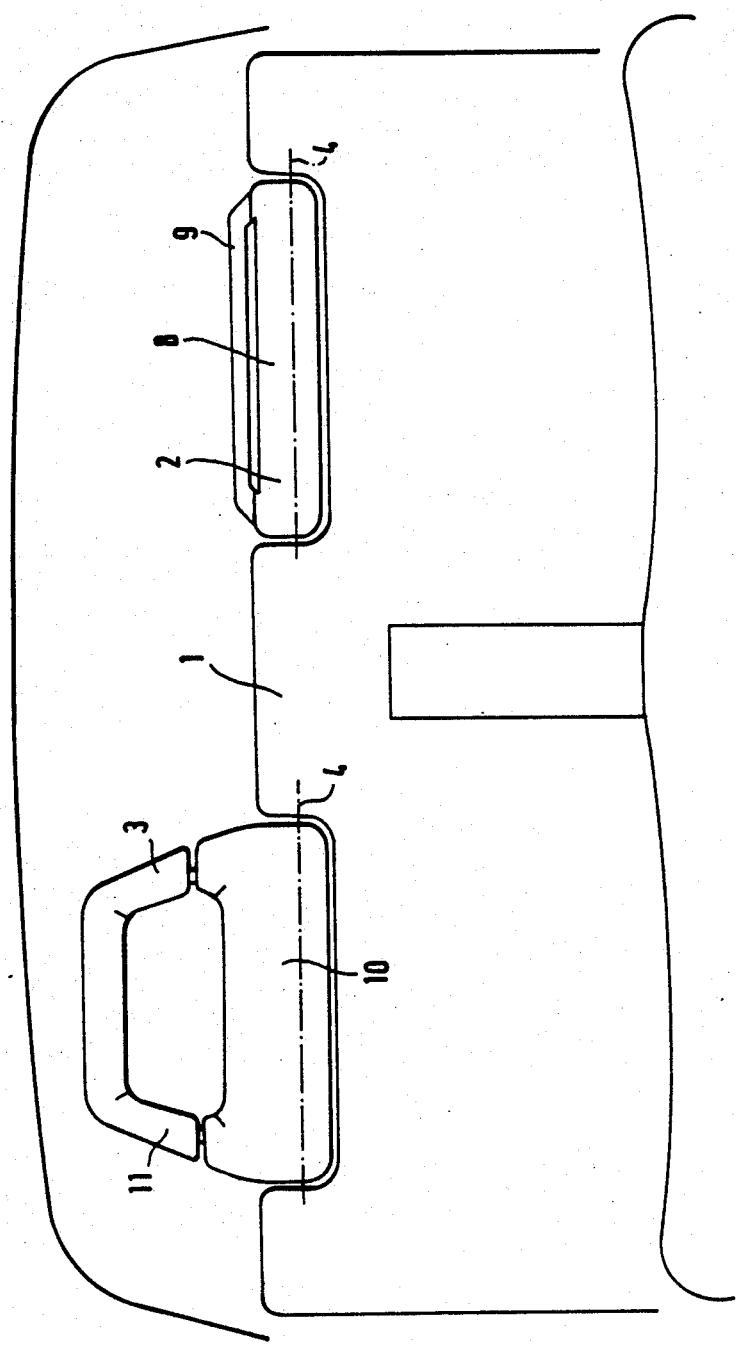
FIG. 2 is a front view of the backrest with the headrests, one in the head support position and the other in the storage position.

FIG. 2 is a schematic illustration of the backrest 1 as viewed, for instance, from one of the front seats. In this figure the headrest 2, which is located in back of the driver's seat, is folded down into the storage position, whereas the headrest 3 is in a head-support position. With the headrest 2 being folded down rearwardly, the driver of the vehicle is afforded an unobstructed view towards the rear.

The headrests 1, 2 illustrated in FIGS. 1 and 2 are comprised, respectively, of a lower headrest member 8, 10 and a height-adjustable upper headrest member 9, 11 which can be retained by means of a support element in a position in which it is spaced apart from the lower headrest member 8, 10. The upper headrest member 9 of headrest 2 in FIG. 1 has been spaced apart, by means of support element 12, from the lower headrest support member 8 and is being retained in this position. One pair of support elements 12, 13 are fastened to each of the upper headrest members 9, 11 and are adapted for slidable displacement in each of the lower headrest members 8, 10. The upper headrest member 11, upon full insertion of the support elements into the guide members contained in the lower headrest member 10, is not spaced apart from the lower headrest member 10. With the upper headrest members 9, 11 being in a position in which they are not adjusted for height, the headrests require only a minimum on storage space in the utility shelf 7, and the invention therefore proposes that in the exemplary embodiment according to FIG. 1 the headrests be folded into this storage position from this lowermost height position.

The headrest pivoting means are described in the following in conjunction with FIGS. 3 to 8.

FIG. 3 is a partial sectional view of an arrangement for use, for instance, with headrest 2. The headrest 2 is provided on both sides, near the lower side of the lower headrest member 8, with pivot pins 14, 15 which are insertable in bushings 16, 17 mounted in the backrest 1. The axes of the bushings 16, 17 are in mutual alignment and are defining the axis 4 about which the headrest 2 is pivoting.

The pivot pins 14, 15 are arranged on one end of each spindle 18, 19, respectively. The spindles 18, 19 are inserted and are axially displaceable in a through-bore 20 of a guide housing 21 fastened to the lower headrest member 8. The spindles 18, 19 have arranged between their confronting ends a preloaded spring 48.

The guide housing 21 is comprised of a generally hollow cylindrical mid-portion and of end portions provided with radially extending arms which are firmly embedded in the lateral surfaces of the lower headrest member 8.

To enable axial displacement, each headrest spindle 18, 19 is provided with control levers 22, 23 which are accessible from the outside through openings 24, 25 provided in the guide housing 21 and the lower headrest member 8. The configuration of the openings 24, 25 is apparent from FIG. 4. The openings 24, 25 are in the form of window sections in the hollow cylindrical portion through which the operating levers 22, 23 are extending. The openings 24, 25 are long enough to permit sufficient axial displacement of the spindles 18, 19 in the directions indicated by the arrows to pull the pivot pins 14, 15 inside the bore 20. It is apparent, especially from FIG. 5, that the spindles 18, 19 are also provided with drive cams 27, 28 which are of rectangular cross section and which are adapted for sliding displacement in correspondingly shaped rectangular slots. The slots are of sufficient length to permit axial displacement of the spindles 18, 19 in the direction of the arrows so that the pivot pins 14, 15 can be pulled inside the bore 20. The drive cams 27, 28 serve as a means to transmit the rotary movement imparted on the spindles 18, 19 to the lower headrest member 8.

The pivot pin 15 of the spindle 19 is provided with a profiled recess for receiving a correspondingly profiled shaft end of a worm wheel 31 which is in meshing engagement with a screw 32. The profiled shaft end and the associated profiled recess serve as a torque transmitting coupling between the spindle 19 and the worm wheel 31. The screw 32 is connected to the output shaft of the drive means, i.e., the electric motor 33 of the adjusting mechanism. The electric motor is mounted inside the rear seat and fastened thereto. The drive mechanism formed by the worm wheel 31 and screw 32 is of the self-arresting type.

The procedure of installing the electrically pivotable headrest 2 illustrated in FIG. 3 into the backrest 1 in the assembly plant involves the steps of placing the headrest 2, while the pivot pins 14, 15 are retracted into the bore 20, into the space of the backrest 1 provided therefor and inserting the pivot pins 14, 15 into the bushings 16, 17 so that the headrest 2 is adapted for pivoting movement on the backrest 1. The procedure of withdrawing the pivot pin from the bushings and retaining them inside the bore during installation of the headrest 2 is accomplished in that the spindles 18, 19 are axially displaced by means of the control levers 22, 23 against the force of the preloaded spring 48, whereas insertion of the pins 14, 15 into the bushings is effected with the assistance of the force exerted by the same spring. During the insertion procedure, the profiled recess in pin 15 is urged onto the profiled shaft end of the worm wheel 31 whereby a driving connection is established with the electric motor 33.

Pivoting movement of the headrest 2 from the storage position into one of the head-support positions or vice versa is controlled by a switch for energizing the motor 33 which may be located, for instance, on the dashboard. The control circuit is of the type which enables the motor to run in either direction. Once the headrest 2 reaches the limit position in one or the other direction of pivoting, the motor is automatically deenergized by a limit switch. Since in this embodiment pivoting of the headrest into the storage position is by remote control, the size and configuration of the headrest storage compartment in the utility shelf is such that it can accommodate the headrest even if the upper headrest member is in its uppermost head support position.

The arrangement described above enables to selectively fold down the headrest, by remote control, into a storage position or to raise it into a head support position. Since the drive is of the self-arresting type, the headrest can be retained in any desired position between the one or the other limit position, i.e., the headrest is adapted to be adjusted by remote control into infinitely variable head-support positions.

The exemplary embodiment according to FIG. 7 of an arrangement for pivoting or folding down the headrest corresponds in most aspects with the one illustrated in FIG. 3. Elements which are identical to the first embodiment have therefore been identified by like numerals.

The arrangement and operation of the bushings and the associated spindles 34, 35 with pivot pins 14, 15 as well as control levers 22, 23 are illustrated in FIGS. 3 and 4 and have been described earlier and therefore need not be illustrated or described again. In the embodiment illustrated in FIG. 7, the operation of pivoting the headrest 2 from a storage position into a head-support position or any position therebetween, and from a head-support position into the storage position, as well as the operation of locking the headrest into and unlocking it from a head-support position is carried out manually. In the absence of a servo mechanism for the pivoting movement there is no need for the drive cams 27, 28 that were required in the embodiment according to FIG. 3, to drive the spindles 18, 19 and the associated grooves 29, 30 in the guide housing 36, and the profiled recess in the pivot pin 15 can also be dispensed with. However, for the sake of communality in parts and reduced inventory expense, it may be preferable to use these parts also in the arrangement described in this exemplary embodiment.

To accommodate the parts of the locking mechanism 40 used for retaining the headrest in its pivoting position, the guide housing is provided with a dead-end bore 37 which extends parallel to the bore 20 and is spaced at a distance thereabove. A latch pin 38 is provided which is adapted for axial displacement in the dead-end bore 37. A spring 39 is arranged in the space between the bottom of the dead-end bore 37 and the end of the latch pin 38. The latch pin 38 is provided with an actuating device 41 which extends through a lateral opening 42 in the guide housing 36. Lateral opening 42 intersects the dead end bore 37. The free end of the actuating device 41 is in the form of a push key which is accessible by way of the lateral surface of the lower headrest member 8. The end of the latch pin 38 facing away from the spring 39 extends, when in the rest position, out of the guide housing 36 and past the lateral surface of the lower headrest member 8. It engages into recesses 43 formed in the bushing 44 which is arranged opposite the lateral surface of the lower headrest member 8 and which is associated with the pivot pin 35. The length dimension of the opening 42 is such that the latch pin 38, upon manually pressing against the end of the push key provided on the actuating device 41, can be moved, against the bias of spring 39, out of the recess 43 so that the headrest can be pivoted.

As is apparent from FIG. 8, recesses 43 are aligned at equally spaced arcuate intervals about the center of pivot pin 15 and are in the form of bores extending through the plate-like bushing 44. The limit positions for the pivotable headrest 2 are defined by the recesses 43a, 43b of which the recess 43a is provided for the storage position.

The arrangement according to FIGS. 7 and 8 enables the headrest to be manually folded down into a storage position, to be erected into a head-support position, and to be pivoted between head-support positions. The headrest can be locked between the two limit positions into intermediate positions which are dictated by the spacing of the recesses. The arrangement permits manual stepwise adjustment of the headrest into various head-support positions.

The following is a description, by way of FIGS. 9–14, of a preferable embodiment which enables the upper headrest member to be raised and lowered into various head-support positions.

Figure 9:
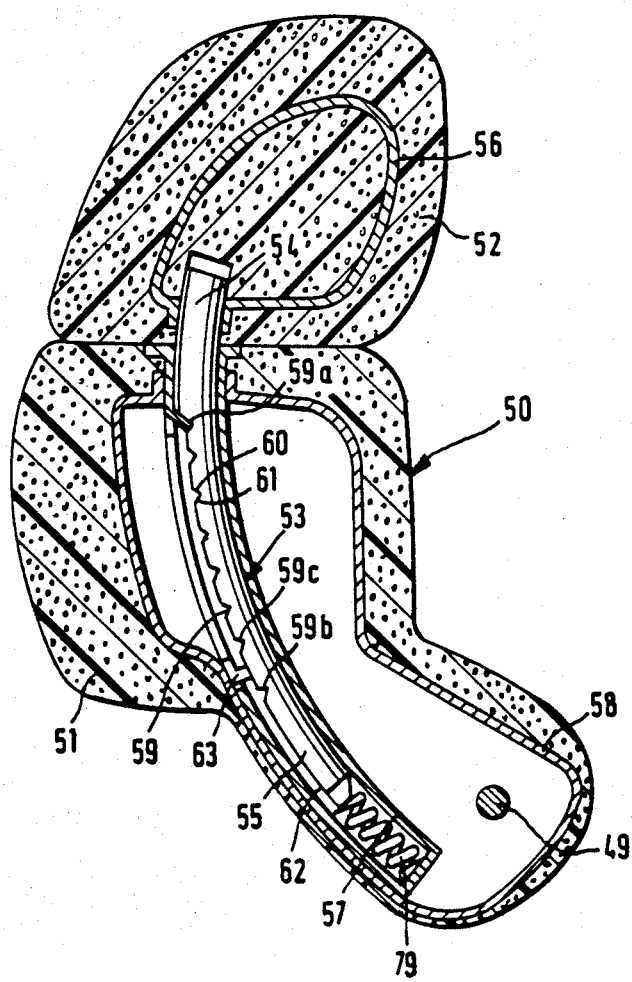
FIG. 9 is a cross sectional view of a headrest wherein the headrest members have been moved in abutting relationship with each other.

FIG. 9 illustrates a headrest 50 with a configuration that is somewhat different from the headrests described earlier, but the mounting arrangement on the backrest, preferably the backrest of a rear seat, is of the type described in the foregoing. The two-part headrest 50, which is comprised of a lower headrest member 51 and an upper headrest member 52, is adapted for pivoting movement, by way of devices illustrated in FIGS. 3–8, between a storage position and a head-support position about the axis 49.

The upper headrest member 52 is adapted, via a support element arranged between the headrest members, for stepwise height adjustment relative to the lower headrest member by means of a click-stop mechanism. The support element is a ratchet bar 53 with a series of indentations 59 and is comprised of a first portion 54 having a first circular cross section and a second flattened portion 55 having a smaller second cross sectional shape corresponding to a segment of a circle. The ratchet bar 53 is fastened to the frame 56 of the upper headrest member 52 and is mounted for slidable displacement in a tubular guide member 57 with an annular cross section. The guide tube 57 extends inside the lower headrest member 51 and is attached to the frame 58 of said member.

Figure 10:
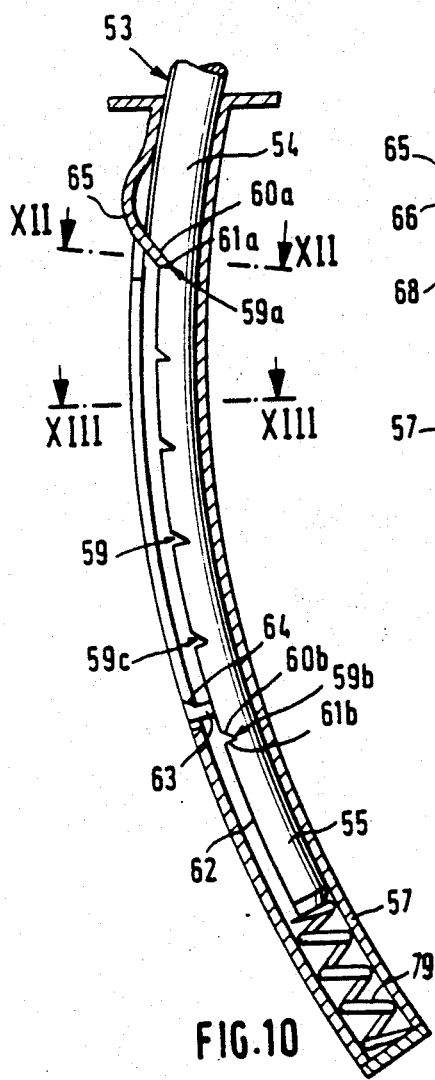
FIG. 10 is a cross sectional view of the click-stop mechanism of the headrest arrangement according to FIG. 9.

The indentations 59 on the ratchet bar are in the form of notches which extend transversely to the axis of the ratchet bar 53, and each notch 59 has two engagement surfaces 60, 61 which have dissimilar angles of inclinations with respect to the axis of the ratchet bar. As illustrated in FIGS. 9 and 10, each of the upper surfaces 60 is inclined towards the axis at an angle of about 45°, whereas the lower engagement surface 61 forms an angle with the axis of about 90°.

The uppermost notch 59a is for the position in which the upper headrest member 52 of the headrest 50 is not raised up at all from the lower headrest member 51. The notch 59a is located at or adjacent the transition between the cylindrical portion 54 and the flattened portion 62. The engagement surface 60a of notch 59a extends from the bottom of notch 59a to the peripheral surface of portion 54, whereas the engagement surface 61a terminates at the flattened surface 62. All other notches 59 are starting from the surface of the flattened portion 62.

In the region adjacent to and above the lowermost notch 59b, the ratchet bar 53 is provided with a pawl 63. The pawl 63 extends radially to the axis and its free end has an angled surface 64.

The tubular guide member 57 is provided at its end disposed inside the lower headrest member 51 with a bottom, but its other end, which terminates at the upper side of the lower headrest member 51, is open. The tubular guide member 57 is provided with a collar at its open end is fitted by means of this collar into the upwardly facing side of the lower headrest member 51.

Figure 11:
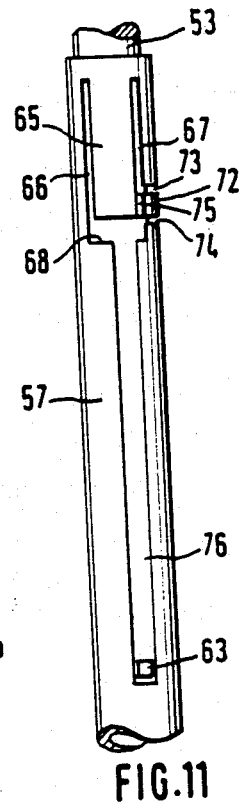
FIG. 11 is a side view of the click-stop mechanism according to FIG. 10.

The detent element 65 for the click-stop mechanism is arranged on the tubular guide member 57, the arrangement being such that a portion of the upper end of the tubular guide member is formed as a spring leaf detent 65. This spring leaf 65, which serves as the detent element, extends substantially in the longitudinal direction and is formed from a part of the peripheral wall of the tubular guide member 57. As illustrated in FIG. 11, the tubular guide member 57 has formed in its peripheral wall two axially extending slots 67 which define the width of the spring leaf. Furthermore, a transversely extending slot 68 is formed in the guide tube which defines the length of the spring leaf 65. The spring is bent and its longitudinal profile is such that its free end extends inside the tubular guide member 57.

Figure 12:
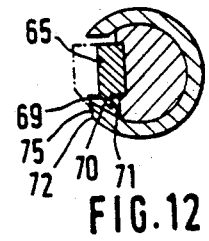
FIG. 12 is a section along line XII—XII of FIG. 10.

As illustrated in FIG. 12, the end of the spring leaf has a lateral portion in the form of a tongue-like detent 69 which extends past the width of the spring leaf 65. The laterally extending portion is provided with an outer angled sliding surface 70. Furthermore, the laterally extending portion is provided with a detent surface 71 which is not angled and which is arranged opposite the sliding surface 70.

The tubular guide member 57 has formed in the region of the tongue-like detent 69 a circumferentially extending detent portion 72 which is arranged in a finger-like manner opposite the sliding surface 70 to aid in controlling the position of the spring leaf 65. The tubular guide member 57 is provided with a pair of slots 73, 74 which extend transversely to the axis of the guide member and which define the width of the finger-like detent portion 72. The amount by which the finger-like detent portion 72 extends circumferentially is defined by a detent surface 75 which extends parallel to the detent surface 71 of the spring leaf 65.

Figure 13:
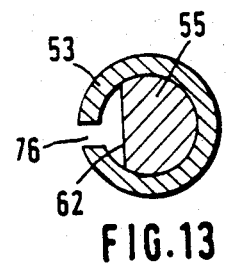
FIG. 13 is a section along line XIII—XIII of FIG. 10.

Starting from the slot 68, the tubular guide member 57 is provided with a longitudinally extending slot 76 which serves as a guide track for the pawl 63 of the ratchet bar 53. As illustrated in FIGS. 11 and 13, the longitudinally extending slot 76 and the pawl 63 are axially offset to enable interengagement of the angled surface 64 of the pawl 63 with the angled surface 70 of the spring leaf 65. The dimension of the longitudinal slot 76 is such that when the ratchet bar 53 is pushed inwardly during vertical headrest adjustment, the pawl 63 is guided in the longitudinal slot 76 and is allowed free movement therein.

Figure 14:
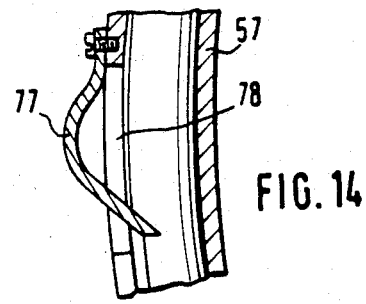
FIG. 14 is a detail of the click-stop mechanism of a headrest arrangement.

FIG. 14 illustrates an exemplary embodiment in which the detent element of the click-stop mechanism is in the form of a separate leaf spring 77 which is secured to the tubular guide member 57. Unlike the arrangement according to FIG. 11, wherein the spring leaf 65 is formed from the wall of the tubular guide member 57, the tubular guide member 57 according to the arrangement illustrated in FIG. 14 is provided with an opening 78 which is defined by the slots 66, 67 and 68 and a transversely extending slot located in the region of the base of the spring leaf. The opening 78 enables the spring leaf to extend into the guide tube 57.

The bottom of the tubular guide member 57 serves as a base for the spring 79. The upper end of spring 78 is in engagement with ratchet bar 53 in the tubular guide member 57 and biases the same generally upwardly.

The operation of the height adjustment mechanism will be apparent from the following description:

When the upper headrest member 52 is not adjusted upwardly from the lower headrest member 51, the components assume the position illustrated in FIGS. 9 and 10. The spring 79 is preloaded and exerts an upwardly directed force against the ratchet bar 53. The end of spring leaf detent 65 engages into the notch 59a and is bearing against the engagement surface 61a, so that upward movement of the ratchet bar 53 with the upper headrest member 52 is prevented.

To initiate height adjustment of the upper headrest member 52, the upper headrest member 52 is manually pushed downwardly in the direction of the lower headrest member 51. This will also cause the ratchet bar 53 as well as the engagement surface 60a to be pushed downwardly. The end of the spring leaf detent 65, which is substantially rigid in longitudinal direction, disengages from the engagement surface 61a and, at the same time, is urged radially outwardly by the angled engagement surface 60a until the end of spring leaf 65 is sliding on the peripheral wall of portion 54 of the ratchet bar 53. The spring leaf 65 has now assumed its radially outermost position.

During the course of this movement, the tongue-like detent 69 of the spring leaf 65 has been urged into engagement with the sliding surface 70 on the inner surface of the finger-like detent portion 72 and has subsequently been caused, due to the elastic deformation of the finger-like detent portion 72, to slide outwardly and, due possibly, to the lateral elastic deformation of the spring leaf 65, to slide above the edge of the engagement surface 75, so that the elastically deformed parts will change from a preloaded into a relaxed state. This latching engagement will cause the engagement surface 75 to be located in the path of movement of the engagement surface 71 on the spring leaf 65. When both surfaces 71, 75 are in engagement with each other, the spring leaf 65 is retained in a position in which its end is radially spaced apart from the flattened portion 62 of the ratchet bar 53 and is therefore prevented from engaging into the notches 59.

If now the manually exerted downward pressure is being sufficiently reduced, the spring 78 is enabled to displace the ratchet bar together with the upper headrest member 52 upwardly. Due to the engagement that will occur between the pawl 63 and the spring leaf 65, outward displacement of the upper headrest member 52 is limited to a predetermined stroke length, and this stroke length constitutes the maximum possible height adjustment position of the upper headrest member 52. When the pawl 63 is moved into abutment against the spring leaf 65 in the region of the sliding surface 70, the spring leaf 65 is elastically deformed so that the overlapping engagement between the engagement surfaces 71, 75 is being suspended. This will cause the spring leaf 65 to be released from the detent portion 72 of the tubular guide member 57 and to elastically move inwardly until the end of the spring leaf 65 abuts against the flattened portion 62 of the ratchet bar 53 and is urged eventually in engagement with the engagement surface 61b of the lowermost notch 59a. Upon engagement with the engagement surface 61b, outward movement of the ratchet bar 53 is terminated and the upper headrest member 52 is locked into its uppermost position. If this uppermost headrest position is not the position desired by the seat occupant, the upper headrest member 52 is manually pushed downwardly. This will cause the end of the spring leaf 65 to be urged, by way of the angled engagement surface 60, radially outwardly and to slide on the flattened portion 62 until it engages the notch 59c adjacent to the notch 59b. If this locking position of the upper headrest member 52 corresponds to the desired height, manual headrest actuation is being terminated. The force of spring 79 will cause the ratchet bar 53 to be retained with its engagement surface 61 in locking engagement with the spring leaf detent 65.

If the height position of the upper headrest member 52 is to be reduced further, the upper headrest member 52 is pushed again downwardly.

If the upper headrest member 52 is to be raised from an intermediate position and to be locked into a higher headrest position, it must first be moved downwardly into abutting relationship with the lower headrest member in order to temporarily deactivate the click-stop mechanism. The upper headrest member 52 must then be raised to its end position again before it can be adjusted to the desired height position.

The mechanism illustrated in FIGS. 9-14 enables manual stepwise adjustment of the upper headrest member 52 between an upper and lower limit position. Since there are no separate locking or unlocking devices that have to be manipulated, adjustment of the headrest can be executed with one hand. The adjustment steps may be spaced apart at selected intervals by spacing the notches at the appropriate distances from each other.

Figure 15:
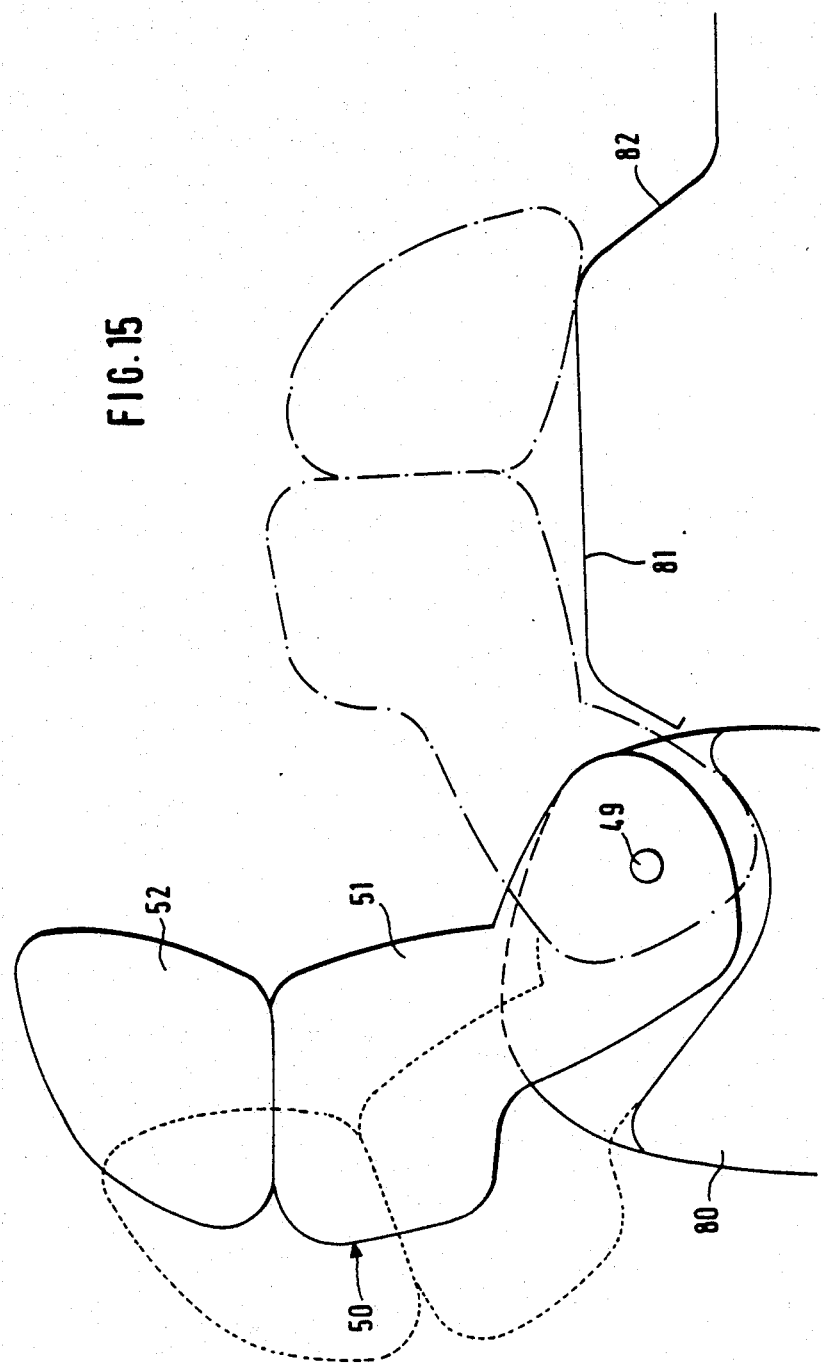

FIGS. 15 and 16 illustrate schematically the headrest according to FIG. 9 in various height as well as pivoting positions, and equivalent parts are denoted by like reference numerals.

The lower headrest member 51 is mounted on the backrest 80 of a rear seat and is adapted for pivoting movement about the axis 49. The rear seat 80 is succeeded by a utility shelf 81 which is provided with a recessed compartment 82 for accommodating portions of the headrest 50 when the same is in the folded-down position.

In FIG. 15, the headrest 50, indicated by the solid line, is in a head-support position between the forward and rearward limit position, but its upper headrest member 52 has not been adjusted to any of the height positions. In the limit position indicated by the dash-dotted lines, the headrest 50 is in a storage position in which it is folded down rearwardly. In this position, the greater part of the headrest has been removed from the field of view of the driver. In the position indicated by the dotted lines, the headrest 50 has been pivoted into its extreme forward position.

In FIG. 16, the headrest 50 is illustrated in various pivoting positions and its upper headrest member 52 is raised to its uppermost position. The solid lines indicate a head-support position of the headrest 50. In the position illustrated by the dash-dotted lines, the headrest 50 is folded down and is in the storage position. In the limit position illustrated by the dotted lines, the headrest 50 is pivoted into the maximum forward position.

If the upper headrest member is carried on the lower headrest member by two support rods instead of one, it is sufficient that only one support rod be provided with ratchet means.

The embodiments of the invention in which an exclusive property or privilege is claimed are defined as follows:

1. A foldable headrest for a rear vehicle seat, said headrest having a lateral surface, said headrest being mounted for pivoting movement on a seat backrest of said rear vehicle seat, said rear vehicle seat backrest having bushings with aligned bores and at least one of said bushing having recesses in an arc, said headrest in combination comprising:
    a lower headrest member mounted by pivot pins into said aligned bores of said backrest and said lower headrest member having a dead end bore parallel with said aligned bores of said backrest and said lower headrest having a lateral opening intersecting said dead end bore;
    a spring arranged in said dead end bore; and
    a latch pin adapted for axial displacement in said dead end bore, said latch pin having an actuating device extending through said lateral opening and said actuating device at a free end having a push key accessible by way of said lateral surface of said lower headrest member, and said latch pin in said dead end bore has one end facing said spring and said latch pin end facing away from said spring extends in a rest position past the lateral surface of said lower headrest member into one of said recesses in an arc whereby manually pressing against said push key allows said actuating device to be moved against the biasing of said spring to remove said latch pin out of one of said recesses so that said headrest can be pivotally stepwise adjusted into another position.

2. A vehicle seat headrest adjustable in height in a stepwise manner in relationship to a seat backrest, said headrest in combination comprising:
    a headrest frame;
    a ratchet bar with an axis, said ratchet bar being fastened to said headrest frame, said ratchet bar having a series of transverse indentions, said ratchet bar having a section with a first cross-sectional shape and a second section with a smaller second cross-sectional shape with at least one indention adjacent a transition between said first and second cross-sectional shapes and said ratchet bar having a pawl;
    a guide member attached with said seat backrest slidably mounting said ratchet bar for displacement of said ratchet bar therein;
    spring means engaged with said ratchet biasing the same generally upwardly within said guide member,
    a spring leaf biased for engagement with said indentions to set the position of said headrest via said ratchet bar, and said spring leaf preventing upward adjustment and allowing downward adjustment of said headrest via said ratchet bar when said spring leaf is engaged with said indentions and means controlling the positioning of said leaf spring, whereby said controlling means retains said spring leaf in a position away from engagement with said indentions when said ratchet bar is pushed downward from the position of said ratchet bar where said spring leaf is engaged with the uppermost indention of said ratchet bar and whereby said headrest via said ratchet bar can be adjusted to an extreme upward position whereby said pawl releases said spring leaf from said control means allowing said spring leaf to re-engage with said ratchet bar indentions whereupon said headrest can be adjusted downward in a stepwise manner to the height desired.

3. A headrest as described in claim 2 wherein said guide member is mounted in a lower headrest member which is in turn pivotally connected with said seat backrest.

4. A headrest as described in claim 2 wherein said ratchet bar is arcuate.

5. A vehicle headrest is described in claim 2 wherein said spring leaf has a tongue-like detent lateral portion having an outer angle sliding surface and a detent surface arranged opposite said sliding surface, said tubular guide member having a finger-like circumferentially extending detent portion arranged opposite the sliding surface of said tongue-like detent and whereby movement downward of said ratchet bar from a position of engagement of said leaf spring in the uppermost indention of said ratchet bar causes said leaf spring to be pushed outwardly by said transition between the first and second cross-sectional areas of said ratchet bar, and upon being pushed radially outward by the downward movement of said ratchet bar, said tongue-like detent is detained by a detent surface of said finger-like detent, whereby said spring leaf is laterally offset and held by said finger-like detent to remain out of engagement with said indentions on said ratchet bar and whereby movement of said ratchet bar is limited in an upward direction by said pawl engaging with said leaf spring to disengage said tongue-like detent from engagement with said finger-like detent whereby said spring leaf engages with the lowermost said indention of said ratchet bar to define the uppermost position of said headrest with respect to said seatback.

6. A vehicle seat headrest adjustable in height in a stepwise manner in relationship to a seat backrest, said headrest in combination comprising:
a headrest frame;
a ratchet bar with an axis, said ratchet bar being fastened to said headrest frame, and said ratchet bar having a section with a first large cross-sectional area, and a second cross-sectional area with a smaller cross-sectional area, and said ratchet bar having a series of transverse indentions including an uppermost indention in the transitional area between first and second cross-sectional areas and a lowermost indention in said second cross-sectional area, and said ratchet bar having at lower end a pawl with an angled surface;
a guide member attached with said seatback rest slidably mounting said ratchet bar for axial displacement with said ratchet bar, said guide member having a slot aligning said pawl;
a spring confined between the lower end of said guide member and said ratchet bar biasing said ratchet bar in a generally upward direction;
a spring leaf biased for engagement with said indentions of said ratchet bar to set the position of said headrest via said ratchet bar and said spring leaf preventing upward adjustment and allowing downward adjustment of said ratchet bar when said spring leaf is engaged with one of said indentions, said spring leaf having a tongue-like laterally extending detent provided with an outer sliding surface and an opposite detent surface;
a detent circumferentially arranged in a finger-like manner opposite the sliding surface of said tongue-like detent of the spring leaf, said finger-like detent providing a detent surface whereby movement of the ratchet bar down from a position of engagement of said uppermost indention with said spring leaf causes said spring leaf to be urged radially outward by said transitional area of said ratchet bar whereby said spring leaf is then laterally retained by said tongue-like detent by being engaged with said detent surface of said finger-like detent wherein said headrest can be freely adjusted into an extreme upper position whereby said pawl angled surface releases said tongue-like detent from said finger-like detent allowing said spring leaf to be engaged with said lowermost indention of said ratchet bar and whereby said headrest via said ratchet bar can be adjusted to a lower position by pushing down on said ratchet bar.

* * * * *